United States Patent
Pluta

(10) Patent No.: US 9,409,498 B2
(45) Date of Patent: Aug. 9, 2016

(54) VEHICLE SEAT, IN PARTICULAR MOTOR VEHICLE SEAT

(75) Inventor: Wolfgang Pluta, Heiligenmoschel (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 165 days.

(21) Appl. No.: 13/884,948

(22) PCT Filed: Oct. 25, 2011

(86) PCT No.: PCT/EP2011/005360
§ 371 (c)(1),
(2), (4) Date: Jul. 25, 2013

(87) PCT Pub. No.: WO2012/062410
PCT Pub. Date: May 18, 2012

(65) Prior Publication Data
US 2013/0292986 A1    Nov. 7, 2013

(30) Foreign Application Priority Data

Nov. 11, 2010   (DE) .......................... 10 2010 051 497

(51) Int. Cl.
*B60N 2/225* (2006.01)
*B60N 2/68* (2006.01)
*B60N 2/22* (2006.01)

(52) U.S. Cl.
CPC ............... *B60N 2/22* (2013.01); *B60N 2/2252* (2013.01); *B60N 2/2254* (2013.01); *B60N 2/682* (2013.01)

(58) Field of Classification Search
USPC ......... 297/362, 362.12, 362.14, 367 L, 354.1, 297/354.12
See application file for complete search history.

(56) References Cited

U.S. PATENT DOCUMENTS

| | | | |
|---|---|---|---|
| 6,799,806 B2 | 10/2004 | Eppert et al. | |
| 7,571,962 B2 | 8/2009 | Thiel et al. | |
| 8,146,994 B2* | 4/2012 | Doxey et al. | 297/354.12 |
| 2003/0227205 A1* | 12/2003 | Villarroel | 297/354.12 |
| 2007/0182228 A1* | 8/2007 | Elio et al. | 297/354.12 |
| 2010/0127546 A1* | 5/2010 | Dziedzic | 297/367 R |
| 2011/0121629 A1* | 5/2011 | Roth et al. | 297/354.12 |
| 2011/0156462 A1* | 6/2011 | Lim et al. | 297/354.12 |

(Continued)

FOREIGN PATENT DOCUMENTS

| | | |
|---|---|---|
| DE | 44 36 101 A1 | 6/1995 |
| DE | 195 48 809 C1 | 5/1997 |

(Continued)

OTHER PUBLICATIONS

International Search Report in PCT/EP2011/005360 dated Sep. 27, 2012.

(Continued)

*Primary Examiner* — Timothy J Brindley
(74) *Attorney, Agent, or Firm* — Foley & Lardner LLP

(57) ABSTRACT

In a vehicle seat, in particular motor vehicle seat, with a seat part, a backrest which, as a supporting structure, has a backrest structure with at least one side part, and at least one fitting by which the backrest is connected to the seat part and can be pivoted relative thereto, wherein a distance is defined in an axial direction between the fitting and the side part, the backrest structure has at least one profile body which is fixedly connected at one end to the side part and at the other end to the fitting and which at least partially has a profile which is constant in the axial direction.

9 Claims, 4 Drawing Sheets

(56) References Cited

U.S. PATENT DOCUMENTS

Figure 1:
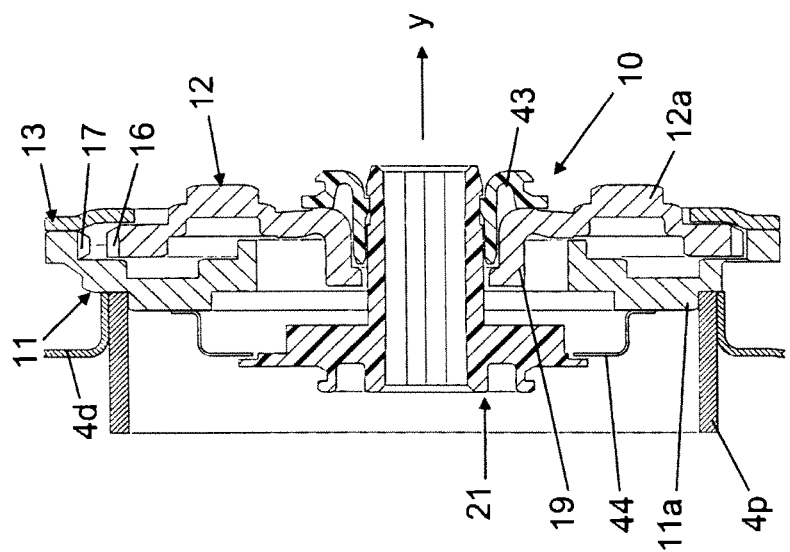

| | | | |
|---|---|---|---|
| 2011/0204691 A1* | 8/2011 | Schuhmacher et al. | 297/354.12 |
| 2012/0217773 A1* | 8/2012 | Jue | 297/188.14 |
| 2013/0001997 A1* | 1/2013 | Gallienne et al. | 297/354.12 |
| 2014/0110984 A1* | 4/2014 | Assmann et al. | 297/354.1 |
| 2014/0300166 A1* | 10/2014 | Matsui et al. | 297/362.12 |

FOREIGN PATENT DOCUMENTS

| | | |
|---|---|---|
| DE | 10 2006 015 560 B3 | 8/2007 |
| DE | 20 2009 017 811 U1 | 7/2010 |
| EP | 2 210 772 A1 | 7/2010 |
| FR | 2805783 A1 | 9/2001 |
| JP | 2003-525163 A | 8/2003 |
| JP | 2009-137348 A | 6/2009 |
| WO | WO-01/64470 A1 | 9/2001 |
| WO | WO-2009/066533 A1 | 5/2009 |
| WO | WO-2010/036238 A1 | 4/2010 |

OTHER PUBLICATIONS

International Preliminary Report on Patentability in PCT/EP2011/005360 dated May 23, 2013.

Office Action dated Apr. 22, 2014 received in corresponding Japanese Patent Application No. 2013-527502.

* cited by examiner

VEHICLE SEAT, IN PARTICULAR MOTOR VEHICLE SEAT

CROSS-REFERENCE TO RELATED APPLICATIONS

This application is a National Phase of International Application PCT/EP 2011/005360, filed Oct. 25, 2011, which was published on May 18, 2012, as WO 2012/062410 A2, which claims the benefit of DE Appln No. 10 2010 051 497.7 filed Nov. 11, 2010, all of which are incorporated herein by reference in their entirety.

The invention relates to a vehicle seat having the features of the precharacterizing clause of claim 1.

In the case of known vehicle seats of this kind, the backrest frame has two side parts, which are connected at the bottom and the top by means of respective crossmembers, thereby ensuring that the backrest frame is closed all the way around. The two fittings, by means of which the backrest can be pivoted relative to the seat part, are each secured on the side parts. Backrest structures of different dimensions are used for different widths of seat part or backrest.

It is the underlying object of the invention to improve a vehicle seat of the type stated at the outset. According to the invention, this object is achieved by a vehicle seat having the features of claim 1. Advantageous embodiments form the subject matter of the dependent claims.

Owing to its at least partially constant profile, the profile body according to the invention is suitable for ensuring that the interaction with other components is independent of the position of the profile body in the axial direction. Owing to this decoupling, the profile body can be positioned in such a way in the axial direction that it compensates for tolerances or other differences in the dimensions of the backrest or of the seat part in the axial direction, for example. The profile body is particularly preferred where variability in width is achieved while using as many identical parts as possible.

The constant profile refers primarily to the outer profile of the profile body, i.e. is intended to mean an envelope curve. Holes, embossed features or other features in the profile body which do not protrude radially outward therefore leave the profile of the profile body constant in the sense according to the invention.

The known property of the profile body can be effective in relation to the side part, in relation to the fitting or in relation to both. Here, the outside of the profile body preferably interacts with a corresponding receptacle of the relevant component. Said receptacle can be extended in the axial direction, relative to the basic material thickness, e.g. in the form of a drawn collar or a welded-on bush, so as to act as a guide during the positioning of the profile body.

Figure 2:
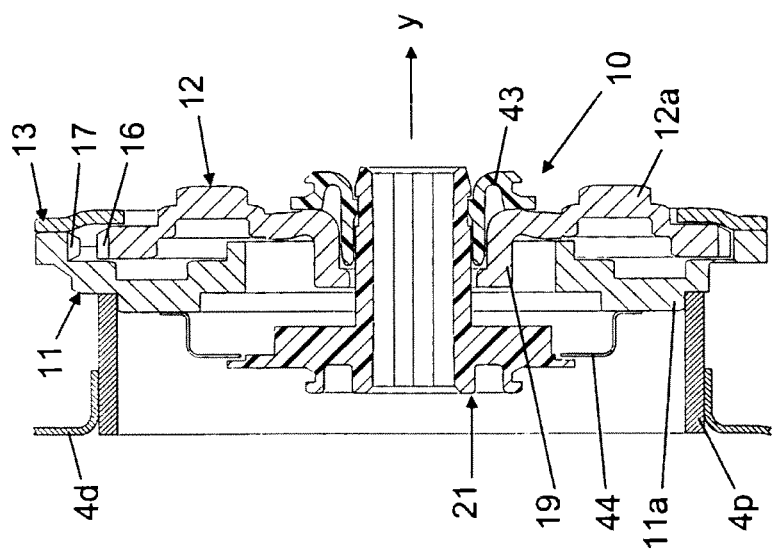
Figure 4:
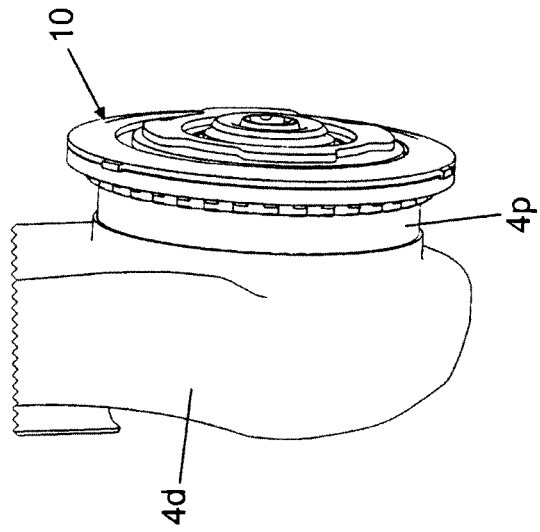
Figure 3:
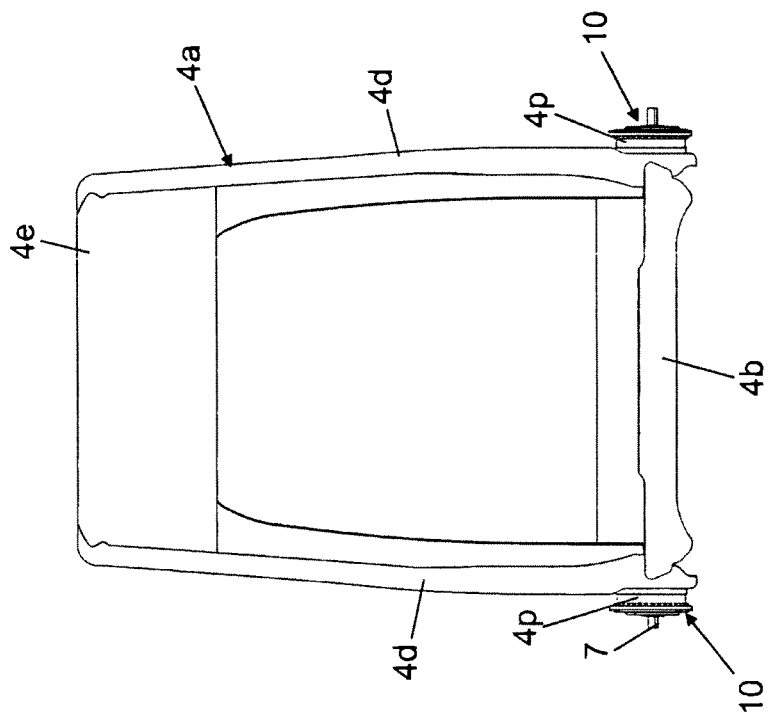
Figure 6:
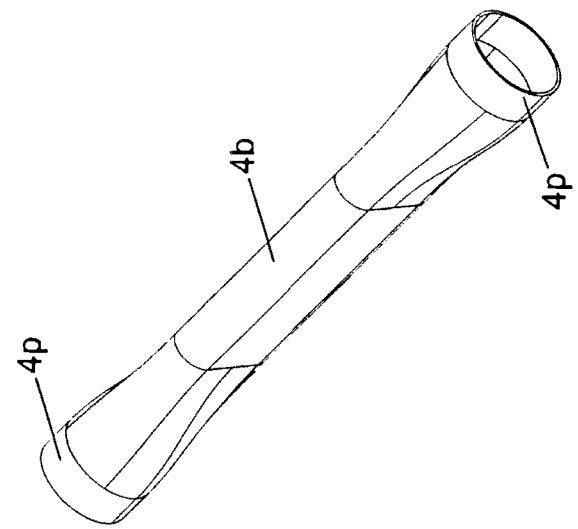
Figure 5:
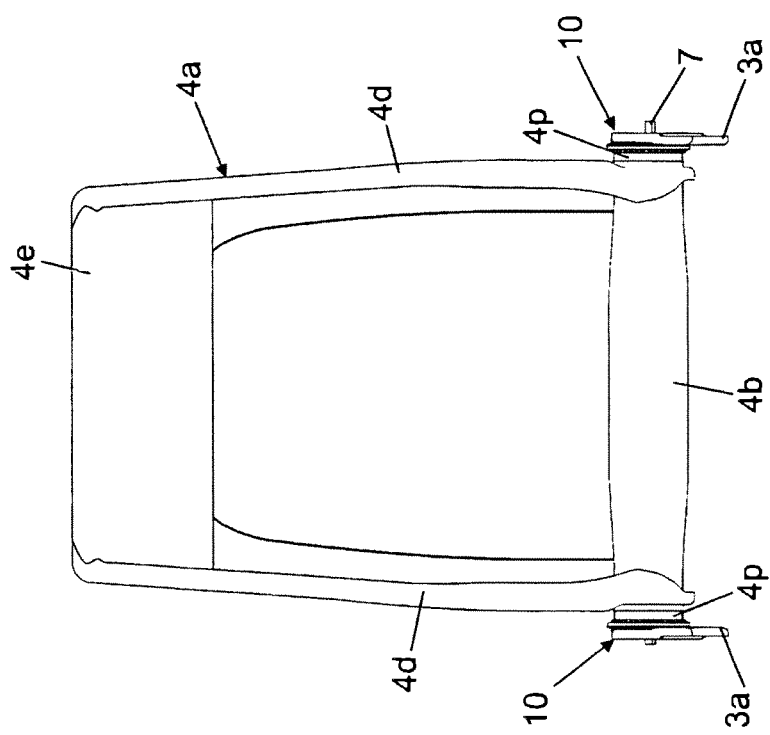
Figure 7:
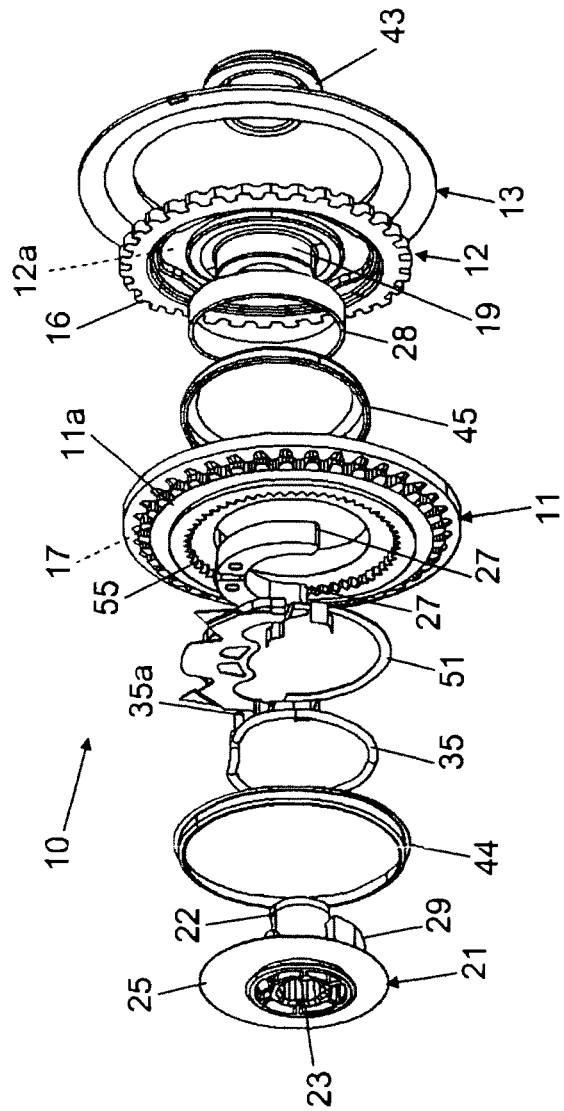
Figure 8:
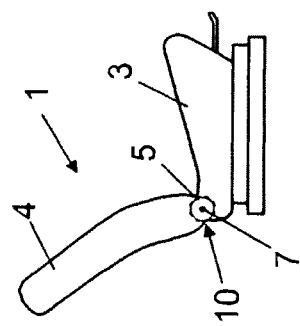

The invention is explained in greater detail below by means of an illustrative embodiment shown in the drawing, in which:

FIG. 1 shows a section in the region of the connection between a backrest and a relatively wide seat part, FIG. 2 shows a section in the region of the connection between the backrest and a seat part that is less wide, FIG. 3 shows a view of the backrest structure according to the first illustrative embodiment, FIG. 4 shows a perspective partial view in the region of the connection between the backrest and a relatively wide seat part, FIG. 5 shows a view of the backrest structure according to the second illustrative embodiment, FIG. 6 shows a perspective view of a lower crossmember according to the second illustrative embodiment, FIG. 7 shows an exploded view of a fitting, and FIG. 8 shows a schematic side view of a vehicle seat.

A vehicle seat 1 for a motor vehicle has a seat part 3 and a backrest 4, which can be pivoted relative to the seat part 3. The direction of travel of the motor vehicle and the customary arrangement of the vehicle seat 1 in the motor vehicle define the direction indications used below, in which the horizontal direction perpendicular to the direction of travel shall be referred to as the axial direction y.

The backrest 4 is upholstered in a manner known per se and, as a supporting structure, has a backrest structure 4a, which in the present case is designed as a peripheral frame. The backrest structure 4a has a lower crossmember 4b, which extends in the axial direction y, perpendicularly to the direction of travel, and horizontally. A side part 4d is attached to the lower crossmember at both ends. An upper crossmember 4e extends parallel to the lower crossmember 4b and is attached to the upper end of the side parts 4d at each of its two ends. At each of its two lower corners, the backrest structure 4a has a profile body 4p.

The profile body 4p extends—at least partially—with a constant profile in the axial direction y. The profile body 4p is preferably of hollow construction, at least in the section with the constant profile. In the present case, the profile body 4p is designed as a metal tube, which has a circular profile, for example. However, other profiles are also possible, e.g. other round or polygonal profiles. The tube can be drawn or welded. An extruded profile is possible as an alternative. As an alternative to (partially) hollow construction, the profile body 4p can be designed as a solid pin with said profile. The profile body 4p is attached to the associated side part 4d. For this purpose, the profile body 4p is inserted into a receptacle of the side part 4d, e.g. into a fork or into an opening. The outside of the profile body 4p interacts with the correspondingly profiled receptacle of the side part 4d—preferably with positive engagement—in the present case with the inside of a drawn collar which provides additional guidance for the profile body 4p in the axial direction y. The profile body 4p positioned in this way is then attached to the side part 4d, preferably welded on.

There are two preferred embodiments for the profile body 4p. In a first illustrative embodiment, the profile body 4p is designed as a separate component, preferably being cut to length from a continuous profile. The side parts 4d are each connected at the lower end thereof to a profile body 4p and—at some other location—to one end of the lower crossmember 4b. In a second illustrative embodiment, the profile body 4p is an integral part of the lower crossmember 4b, i.e. the end section thereof. In the central section, which extends between the side parts 4d, the lower crossmember 4b can have a profile that differs from the profile body 4p. In the drawing, a depression is shown centrally, for example, said depression being matched to the stiffness requirements for the backrest structure 4a.

The backrest 4 can be pivoted relative to the seat part 3 about a pivoting axis extending in the axial direction y, preferably being adjustable in terms of its slope between various positions of use. To adjust the slope of the backrest 4, a drive shaft 7 arranged in the axial direction y in the transition zone between the seat part 3 and the backrest 4 is turned manually, e.g. by means of a hand wheel 5, or by motor, e.g. by means of an electric motor. On both sides of the vehicle seat 1, the drive shaft 7 engages for conjoint rotation in a fitting 10, by means of which the backrest 4 is connected to the seat part 3 and can be pivoted relative to the latter. Two identical or mirror-image fittings 10 are preferably provided.

The fitting 10 has at least one first fitting part 11 and one second fitting part 12, which can be rotated relative to one another. The two fitting parts 11 and can each be inscribed approximately in a circular disk shape. Both fitting parts 11 and 12 are preferably composed of metal, in particular steel, which can be hardened, at least in some area or areas. To absorb the axial forces, i.e. to hold the fitting parts 11 and 12 together, a peripheral clamping ring 13 is provided. The principle involved in such a cohesion provided by means of a peripheral clamping ring is described in U.S. Pat. No. 6,799, 806 B2, for example. The peripheral clamping ring is preferably composed of metal, in particular steel, which is preferably unhardened. The peripheral clamping ring 13 has a substantially flat ring shape.

The peripheral clamping ring 13 is fixedly connected to one of the two fitting parts 11 and 12, in the present case being connected in an outer ring segment to the first fitting part 11, e.g. being welded or, in an alternative embodiment, being flanged (at least partially in the circumferential direction). By means of its radially inward-pointing rim, i.e. in the present case an inner ring segment arranged in a plane perpendicular to the axial direction, the peripheral clamping ring 13 fits over the other of the two fitting parts 11 and 12 in the radially outer edge region thereof, if appropriate with the interposition of a separate slide ring that can move relative to it, and does not hinder the relative rotation of the two fitting parts 11 and 12. Moreover, the mutually facing inner surfaces of the two fitting parts 11 and 12 are protected from the ingress of foreign bodies and dirt and from damage.

The peripheral clamping ring 13 and the fitting part 11 or 12 connected fixedly thereto thus clasp the other of the two fitting parts 11 and 12, which can move relative to them. From a structural point of view, the two fitting parts 11 and 12 therefore jointly form a disk-shaped unit (with the peripheral clamping ring 13).

With the mounting of the fitting 10, the first fitting part 11 is fixedly connected to the backrest structure 4a, i.e. fixed relative to the backrest, for example. The second fitting part 12 is then fixedly connected to the structure of the seat part 3, i.e. is fixed relative to the seat part. However, the associations of the fitting parts 11 and 12 can also be interchanged, i.e. the first fitting part 11 would then be fixed relative to the seat part and the second fitting part 12 would then be fixed relative to the backrest. The fitting 10 is located in the force transmission path between the backrest 4 and the seat part 3.

For a defined interface between the fitting 10 and structural parts of the seat part 3 and of the backrest structure 4a, axially projecting contours are provided on the two fitting parts 11 and 12. In the present case, a star-shaped offset 12a is formed on the second fitting part 12—on the side thereof facing away from the first fitting part 11. The star-shaped offset 12a has a substantially symmetrical star shape with several arms (in the present case a four-armed cross). The star-shaped offset 12a interacts positively with a corresponding opening in the structural part of the seat part 3, in the present case a customer-specific adapter 3a (FIG. 5), and is fixedly connected to the adapter 3a by means of a weld. The weld is produced by means of laser welding or MAG welding, for example, preferably in the axial direction y. In the case of laser welding, the weld can run around the star-shaped offset 12a or can be interrupted. In the case of MAG welding, the weld is preferably provided only at individual designated locations on the star-shaped offset 12a.

In the present case, a circular annular offset 11a is formed on the first fitting part 11 on the side thereof facing away from the second fitting part 12—due to material being pushed out during the embossing of the first fitting part 11, for example. The first fitting part 11 and the profile body 4p interact in that the annular offset 11a engages in the hollow profile body 4p and interacts positively with the inside thereof. In this way, a butt joint is defined. By means of a weld, which preferably runs around the annular offset 11a, the first fitting part 11 and the profile body 4p are fixedly connected to one another. The weld is produced perpendicularly to the axial direction y (i.e. in the radial direction) by means of laser welding or by means of MAG welding, for example.

The profile of the profile body 4p, which is—at least partially—constant in the axial direction y, allows for variation in width, in that seat parts 3 of different widths, i.e. different distance between the fittings 10 in the axial direction y, can be connected to a backrest 4 of defined width, i.e. a defined distance between the side parts 4d in the axial direction, y, using identical parts. At a particular time during the assembly of the vehicle seat 1, the side part 4d of the backrest structure 4a and the profile body 4p attached or to be attached to the fitting 10 are positioned relative to one another in the axial direction y in such a way that the defined distances, i.e. the distance between the fitting 10 and the associated side part 4d on both sides of the vehicle seat—and hence also the distance between the fittings 10 and the distance between the side parts 4d—are obtained, and only then are they fixedly connected to one another.

In the first illustrative embodiment with the separate profile bodies 4p, the backrest structure 4a is preferably already closed to form a frame by means of the two crossmembers 4b and 4e and the side parts 4d at said time, with the result that the distance between the side parts 4d is already set. The profile bodies 4p are then inserted into the receptacles of the side parts 4d in such a way that the sides that face outward in the axial direction y establish the desired distance between the fittings 10 and the associated side parts 4d (and hence the distance between the fittings 10). In this arrangement, all the components of the backrest structure 4a are identical parts.

In the second illustrative embodiment with the profile bodies 4p as integral components of the lower crossmember 4b, said time occurs during the closing of the frame. The axial dimension of the lower crossmember 4b is matched to the width of the seat part 3, i.e. to the desired distance between the fittings 10. The other components of the backrest structure 4a are identical parts. Depending on the design of the receptacle of the side parts 4b, the side parts 4d are pushed onto or placed on the lower crossmember 4b, it being possible in the latter case for the two side parts 4d already to be connected to the upper crossmember 4e.

The profile bodies 4p according to the invention also allow variation in the width of the backrest 4 which can be combined with a seat part 3 of defined width. The upper crossmember 4e would be matched to the desired width of the backrest 4. The other components of the backrest structure 4a could be identical parts. The profile bodies 4p according to the invention can also be used to compensate for tolerances.

The fitting 10 is designed as a geared fitting, in which the first fitting part 11 and the second fitting part 12 are connected to one another by means of a gear for adjusting and fixing, more precisely by means of an eccentric planetary gear—in the present case self-locking—as described, for example, in DE 44 36 101 A1 or DE 20 2009 017 811 U1, the relevant disclosure of which is incorporated expressly by reference.

To construct the gear, an externally toothed gearwheel 16 is formed on the second fitting part 12, and an internally toothed gear ring 17 is formed on the first fitting part 11, the gearwheel and the gear ring intermeshing. The diameter of the addendum circle of the external toothing of the gearwheel 16 is smaller by at least one times the tooth height than the diameter of the dedendum circle of the internal toothing of the gear ring 17. An appropriate difference in the number of teeth of the gearwheel 16 and the gear ring 17 of at least one tooth allows the gear ring 17 to perform a rolling contact motion on the gearwheel 16. The gearwheel 16 and the gear ring 17 are preferably formed by means of a single embossing/stamping operation, which simultaneously punches the fitting parts 11 and out of the starting material thereof. As an alternative, the fitting parts 11 and 12—with similar geometries and the same functions—can be produced by massive forming (preferably cold extrusion or hot extrusion). In the present case, the gearwheel 16 forms the radially outer edge of the second fitting part 12, i.e. radially on the outside, the second fitting part 12 ends with the gearwheel 16.

One of the two fitting parts 11 and 12 has a collar 19, this being on the second fitting part 12 and concentric to the gearwheel 16 in the present case. The collar 19 can be formed as a drawn collar on said fitting part (i.e. formed integrally) or can be attached thereto as a separate sleeve. A driver 21 is rotatably mounted in the collar 19 by means of a hub 22. The driver 21 is preferably composed of plastic. The hub 22 of the driver 21 is provided centrally with a bore 23 for receiving the drive shaft 7. The profile of the bore 23 is of corresponding design to the profile of the drive shaft 7, in the present case a splined-shaft profile. Adjoining its hub 22, the driver 21 has a covering disk formed integrally with the hub 22 and having a larger diameter than the hub 22.

Two wedge segments 27 are supported on the collar 19 by means of their curved inner surfaces and—by means of their curved outer surfaces—they provide a bearing for the other of the two fitting parts 11 and 12, in the present case the first fitting part 11. For this purpose, a receptacle of the last-mentioned fitting part is lined with a plain bearing bush 28, which is preferably pressed in so as to be fixed against relative rotation and on which the outer surfaces of the wedge segments 27 rest. The terms "support" and "provide a bearing" are not intended to be limited to a particular direction of the flow of force through the fitting 10 since this direction depends on the mounting of the fitting 10.

At a radial distance from the hub 22, the driver 21 has a driver segment 29 which reaches with a clearance between the narrow sides of the wedge segments 27 and which is formed integrally with the covering disk 25 and with the hub 22. The wedge segments 27, the broad sides of which face one another, each accommodate an angled end finger 35a of an omega-shaped spring 35, for example by means of respective openings or respective recesses defined by projecting parts of the material. The spring 35 acts upon the wedge segments 27 in the circumferential direction, in particular so as to push them apart, it being possible in operation for the broad sides of the wedge segments 27 to touch and act upon one another.

The driver 21 is secured axially on the outside of the fitting part having the collar 19 by a retaining ring 43, which is preferably snapped on. The retaining ring 43 extends in the axial direction along part of the hub 22, with the result that the hub 22 does not rest directly on the inside of the collar 19, but is supported in the collar 19 via the retaining ring 43 (and, as a result, the driver 21 is supported on the second fitting part 12). On the outside of the fitting part (in the present case the first fitting part 11) having the plain bearing bush 28, a sealing ring 44 is provided between the radially outer edge of said fitting part and the covering disk 25, said sealing ring being made of rubber or of soft plastic for example and being connected to the covering disk 25, in particular being snapped on. The sealing ring 44 can also be made of metal and connected fixedly, e.g. welded, to the first fitting part 11, in which case the covering disk 25 is capable of moving relative to the sealing ring 44. As an option, a separating ring 45, composed of plastic for example, is provided as an internal seal between the two fitting parts 11 and 12 within the installation space.

The wedge segments 27 (and the spring 35) define an eccentric which, as an extension of the direction of the eccentricity, pushes the gearwheel 16 into the gear ring 17 at a point of engagement. When a drive is exerted by the drive shaft 7 (executing multiple rotations), a torque is initially transmitted to the driver 21 and then, by means of the driver segment 29, to the eccentric thus defined, which slides along the plain bearing bush 28 with a shift in the direction of eccentricity and hence with a shift in the point of engagement of the gearwheel 16 in the gear ring 17, this taking the form of a tumbling rolling contact motion, i.e. as a relative rotation with a superimposed tumbling motion. Continuously variable adjustment of the slope of the backrest 4 between a plurality of positions of use is thereby possible.

To improve dynamic operating behavior, a blocking spring 51 of the kind disclosed in DE 195 48 809 C1, for example, is preferably provided in addition as a blocking element. In the present case, the blocking spring 51 interacts with a toothing 55, which is formed as a further gear ring on the first fitting part 11. The blocking spring 51—which is preferably mounted in a movable manner on an axial overhang of the plain bearing bush 28—in each case blocks the wedge segments 27 in the non-driven state (since the blocking spring 51 blocks the spring 35 by resting against the end fingers 35a) and is released by the driven driver 21.

As an alternative, the fitting 10 can be designed as a ratchet fitting, so that the drive shaft 7 pulls back locking elements contained within the fitting 10 against spring preloading by means of a slight rotation, as described, for example, in DE 10 2006 015 560 B3, the relevant disclosure of which is expressly incorporated by reference. The backrest 4 can be freely pivotable, in the case of two-door or three-door motor vehicle seats for example, in order to facilitate access to a rear row of seats. The fitting 10 can then have an additional locking mechanism in the form of a free-swinging unit of the kind described in U.S. Pat. No. 7,571,962 B2, for example, the relevant disclosure of which is incorporated expressly by reference.

LIST OF REFERENCE SIGNS 1 vehicle seat
3 seat part
3a adapter
4 backrest
4a backrest structure
4b lower crossmember
4d side part
4e upper crossmember
4p profile body
5 hand wheel
7 drive shaft
10 fitting
11 first fitting part
11a annular offset
12 second fitting part
12a star-shaped offset
13 peripheral clamping ring
16 gearwheel
17 gear ring
19 collar
21 driver
22 hub
23 bore
25 covering disk
27 wedge segment
28 plain bearing bush
29 driver segment
35 spring 35a end finger
43 retaining ring
44 sealing ring
45 separating ring
51 blocking spring
55 toothing
y axial direction

The invention claimed is:

1. A vehicle seat comprising:
   a seat part;
   a backrest, which, as a supporting structure, has a backrest structure with at least one side part; and
   at least one fitting, by which the backrest is connected to the seat part and can be pivoted relative thereto,
   wherein the at least one fitting includes a first fitting part and a second fitting part,
   wherein the first fitting part is fixedly connected to the backrest such that the first fitting part is not rotatable relative to the backrest,
   wherein the second fitting part is fixedly connected to the seat part such that the second fitting part is not rotatable relative to the seat part,
   wherein the first fitting part and the second fitting part are rotatable relative to each other such that the backrest and the seat part are pivotable relative to one another,
   wherein a distance in an axial direction is defined between the first fitting part and the at least one side part,
   wherein the backrest structure has at least one profile body, which is fixedly connected at one end to the at least one side part and at the other end to the first fitting part to prevent movement of the profile body relative to the side part and the first fitting part and which at least partially has a profile which is constant in the axial direction,
   wherein the distance in the axial direction between the first fitting part and the at least one side part can be adjusted by positioning the profile body in the axial direction relative to at least one of the at least one side part and the fitting before connection.

2. The vehicle seat as claimed in claim 1, wherein the outside of the profile body interacts with a correspondingly profiled receptacle of the at least one side part.

3. The vehicle seat as claimed in claim 2, wherein the receptacle of the at least one side part is of extended construction in the axial direction.

4. The vehicle seat as claimed in claim 1, wherein the profile body is of hollow construction, at least in the section of constant profile.

5. The vehicle seat as claimed in claim 4, wherein the inside of the profile body interacts with a correspondingly profiled offset of the first fitting part.

6. The vehicle seat as claimed in claim 1, wherein the backrest structure has a lower crossmember, two side parts and an upper crossmember, which are connected to form a closed frame.

7. The vehicle seat as claimed in claim 6, wherein the profile body is of integral construction with the lower crossmember.

8. The vehicle seat as claimed in claim 1, wherein the profile body allows variability in the width of at least one of the seat part and the backrest while using identical parts.

9. A method for assembling a vehicle seat, comprising:
   providing the vehicle seat of claim 1;
   positioning the profile body in the axial direction relative to at least one of the side part and the fitting in order to adjust the distance in the axial direction between the first fitting part and the at least one side part during assembly of the profile body; and
   fixedly connecting the profile body to at least one of the side part and the first fitting part.

* * * * *